No. 724,886. PATENTED APR. 7, 1903.
A. O. & E. R. KITTREDGE.
SUMMARIZING SHEET FOR SERIAL BINDERS.
APPLICATION FILED APR. 20, 1901.
NO MODEL.
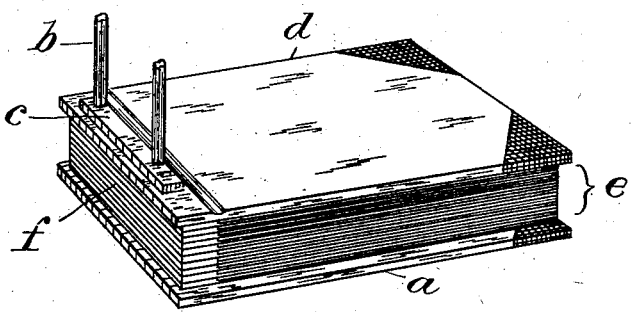
Fig. 1.
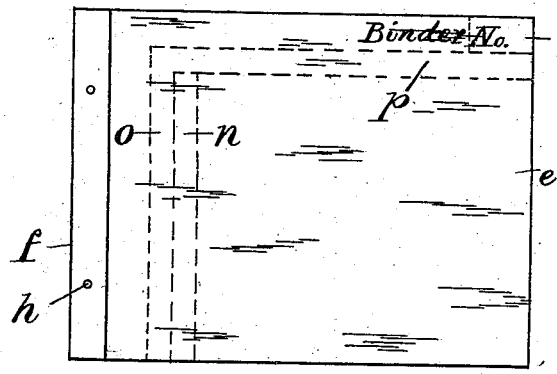
Fig. 2.
Fig. 3.
Attest:
L. Lee.
Walter H. Tabruage.
Inventors.
Anson O. Kittredge and Ernest R. Kittredge,
per Thomas S. Crane, Atty.

UNITED STATES PATENT OFFICE.

ANSON O. KITTREDGE, OF NEW YORK, AND ERNEST R. KITTREDGE, OF BROOKLYN, NEW YORK, ASSIGNORS TO STATIONERY PATENTS COMPANY, OF NEW YORK, N. Y., A CORPORATION OF NEW JERSEY.

SUMMARIZING-SHEET FOR SERIAL-BINDERS.

SPECIFICATION forming part of Letters Patent No. 724,886, dated April 7, 1903.

Application filed April 20, 1901. Serial No. 56,674. (No model.)

*To all whom it may concern:*

Be it known that we, ANSON O. KITTREDGE, whose post-office address and residence is No. 126 East Twelfth street, New York, and ER-NEST R. KITTREDGE, whose residence and post-office address is 183 Sheridan avenue, Brooklyn, State of New York, citizens of the United States, have invented certain new and useful Improvements in Summarizing-Sheets for Serial-Binders, fully described and represented in the following specification and the accompanying drawings, forming a part of the same.

The object of the present invention is to facilitate the subdivision and summarizing of charges or items from records upon various loose papers, so that the amounts or summaries of such items may be posted directly to corresponding ledger accounts without the intervention of a journal, cash-book, or other such book.

The present invention provides for subdividing the items upon the different sheets or records into various classes and collecting them upon a single sheet, which we term a "summarizing-sheet," and upon which the items in the same class may be added together and their total footing posted to the ledger in a single entry.

Where a posting is made from each of a series of sheets, (as invoices or sales-sheets,) the number of entries in the ledger corresponds with the total number of such sheets; but in the present invention our summarizing-sheet furnishes a means of distributing the purchases or sales to several ledger accounts representing different departments of the business, as hardware, groceries, general expense, &c., and the number of postings thus corresponds to the number of ledger accounts or departments into which all the charges are summarized and does not correspond to the number of invoices or sheets as heretofore.

In practicing the present invention the records capable of such summarization (as invoices, sales-sheets, &c.,) are applied to filing-sheets constructed to collect in a serial-binder, where they may be preserved and indexed upon the summarizing-sheet. The summarizing-sheet is formed with a column or line of serially-numbered spaces, and the filing-sheets associated therewith are correspondingly numbered. The summarizing-sheet is also provided with transverse divisions adapted to receive the summaries of the items for different departments or ledger accounts.

The invention is especially useful in filing invoices, orders, &c., as the filing-sheets are numbered serially when they are placed in the binder, and the "sheet-numbers" may thus be used each as a posting-number when the charges upon the invoices themselves are carried to the purchaser's account in the ledger, the same as would the notation of a page of an invoice-book in case the posting were made therefrom. The debit-postings are not made from the invoices but from the summarizing-sheet and only to the limited number of ledger accounts into which the items upon the invoices are summarized, and two contiguous spaces are provided at the foot of each of the summarizing-columns for a footing and for a posting reference, so that items of the same class in all of the invoices are posted from each of the summarizing-columns to the ledger in a single entry. Each of such postings to the ledger represents a selection from a considerable number of the invoices of all the items that relate to the same department or ledger account.

The invention will be understood by reference to the annexed drawings, in which—

Figure 1 represents a binder adapted to contain the filing-sheets and summarizing-sheet referred to. Fig. 2 illustrates one of the filing-sheets, and Fig. 3 the summarizing-sheet, drawn upon a larger scale.

The filing-sheet *e* is shown formed with a stub *f*, having holes *h* for securing it in any suitable form of binder, the one shown being an ordinary post-binder having the base *a*, to which the posts *b* are attached, with a clamp *c*, secured upon the posts and carrying the hinged cover *d*.

A series of filing-sheets *e* is shown secured in the binder, the shanks *f* being shown thicker than the sheets to compensate for the papers attached to the filing-sheets. The papers may be attached by any suitable means, Fig. 2 showing a gummed space *p* for the attachment of an invoice, a gummed space $n$ for the attachment of an order, and a gummed space $o$ for the attachment of a list of goods received. The upper right-hand corner of the sheet $e$ in Fig. 2 is shown provided with a space marked "No." to receive the serial number as it is placed in the binder. The summarizing-sheet $r$ is shown in Fig. 3 with stub $f$, having perforations $h$ to correspond with those of the filing-sheet $e$ to be secured in the same binder, preferably at one end of the series. The sheet $r$ is drawn upon twice the scale of the sheet $e$ to illustrate the rulings more clearly. $g$ designates the serially-numbered rulings, the spaces between which are numbered in the transverse division $s$. (Shown at the left end of the series.) Succeeding transverse divisions are shown marked, respectively, $D'$ $D^2$ $D^3$ $D^4$, adapted to summarize the invoices for a business divided into four departments. These departmental divisions are ruled with two sets of money-columns, marked at the top "Mdse.," to receive the charges for merchandise, and "Exp.," to receive the charges for expense against such department. Another column lettered "G E" is provided to summarize any items of general expense from such invoices, and a succeeding division marked "Total" is provided for the total of the postings in the preceding divisions. The charges in each invoice are thus divided among the different departments and "General expense" by insertion in the appropriate divisions. At the bottom of each division are two contiguous spaces lettered "F" and "P" and marked, respectively, at one end "Footings" and "Postings," the former receiving the footings for the several divisions and the latter serving for the "posting-mark" in transferring such footing to the ledger.

The total amount posted to the recapitulation-sheet under the different headings $D'$ $D^2$ $D^3$ $D^4$ and "G E" are extended in the extreme right-hand column marked "Total," and proof of correct posting is secured by footing in both directions. The summarizing-sheet may be numbered or otherwise marked to designate the binder or group of invoices which it represents.

It will be understood that the abbreviations "Mdse." and "Exp." in the columns $D'$ $D^2$, &c., are only illustrative and that such columns may be appropriately designated for suitable accounts for which the invoices may be charged.

With the illustration shown the summarizing-sheet is adapted for a business divided into four departments and indicates the provision made for charging to the merchandise account of each department, to the expense account of each department, and to the general expense of the business. The invoices for a week or a month, according to the time-schedule upon which the books are being conducted, are recapitulated upon the sheet connected therewith, and the amounts of the invoices are divided and distributed to the other columns, according to their nature. The footing in the space "F" shows the sum-total of charges to a given account or department from all of the invoices during the prescribed period, and the posting-mark in the space "P" shows the account in which such amount has been charged. The numbers in the columns $s$ permit the reference to the several filing-sheets to verify the entries which have been carried therefrom to the recapitulation-sheet.

From the above description it will be seen that all the credit and debit postings required in connection with the invoices or similar records may be made without the intervention of a journal by the use of such summarizing-sheets, while the preservation of the invoices or corresponding papers with the summarizing-sheet furnishes a means of immediately comparing and verifying any items which have been transferred therefrom to the ledger. The invoices and attached summarizing-sheets may be stored in book form and furnish references from the ledger accounts directly to the invoice. They may also furnish references directly from the goods or purchased articles to the invoice by the use of price-tags, as is common in the case of retail stores. Thus the source of supply, the age of the goods, and various other important facts can be immediately discovered with the smallest possible amount of labor.

Where checks are attached to goods in the stores with a reference to the invoice, this system furnishes at once a means of reaching the original order for the goods, the record of the receiving-clerk, and the copy of goods received.

If the date of an invoice be given, by turning to the divisions of the records corresponding to that date the invoice is at once found. If the name of the seller be given, a reference to his ledger account shows the numbers of all the filing-sheets containing the invoices that he has supplied.

This system of recording and indexing invoices furnishes many advantages, as it serves to aggregate or classify different items selected from many papers, so that the summary of such items, which appears in a single figure in the column marked "Footings," may be posted to the ledger in a single charge, and the ledger entry thus represent the sum of such items during a given period, irrespective of the number of original records in which such items are found. Where the sum or aggregate of the charges upon a single filing-sheet is posted to the ledger, as heretofore, as many postings are necessary as there are filing-sheets employed in preserving the records; but where the aggregate of many filing-sheets is summarized by the use of our invention the postings are reduced to the number of the classes into which the items are divided.

The size of the recapitulation-sheet is not material, as the rulings, divisions, and marking of the divisions are the essential parts. The sheet may therefore be made larger than the filing-sheets and folded to bind therewith, and in such case one edge of the recapitulation-sheet would be thickened where it was secured in the binder to compensate for the thickness of the folded portion.

Having set forth our invention, what we claim is—

1. In a serial-binder, the combination, with a binder-clamp having posts to receive the shanks of the filing-sheets and covers to inclose the sheets, of a series of filing-sheets having shanks perforated to fit the said posts, and means for attaching invoices thereto, and a summarizing-sheet $r$ having perforated shank and secured in the binder with such filing-sheets, the summarizing-sheet being ruled horizontally for successive entries, and provided with the division $s$ containing serial numbers, and with a series of additional divisions appropriately designated for summarizing the invoices into sundry departments.

2. In an invoice-binder, the combination, with a series of filing-sheets having means for attaching thereto papers with records capable of summarizing, and shanks perforated to fit the posts of a serial-binder, and the sheets provided with serial numbers as set forth, of the summarizing-sheet $r$ having perforated shank to secure in the binder with such filing-sheets, and such summarizing-sheet being ruled horizontally for successive entries and provided with the appropriately-designated division $s$ for the numbers of the filing-sheets, and with a series of additional appropriately-designated divisions $D'$, $D^2$, $D^3$, &c., for summarizing the items upon the sheets into sundry departments or accounts, and each of such divisions having at the bottom contiguous spaces to receive a footing and a posting-mark, substantially as herein set forth.

3. In an invoice-binder, the combination, with a binder-clamp having posts to receive the shanks of filing-sheets and covers to inclose the sheets, and a series of filing-sheets having records capable of summarization and provided with serial numbers as set forth, of the summarizing-sheet having shanks perforated to fit said posts to secure in the binder with such filing-sheets, and such summarizing-sheet being ruled horizontally for successive entries and provided with the appropriately-designated division $s$ having serial numbers therein, and appropriately-designated divisions $D'$, $D^2$, $D^3$, &c., extended transversely across the horizontal lines for summarizing the records of the filing-sheets, and an appropriately-designated division for the total of each invoice, and each of the summarizing divisions having separate money-columns designated "Mdse." and "Exp.," and having at the bottom a space for a footing and a contiguous space for a posting-mark, as and for the purpose set forth.

In testimony whereof we have hereunto set our hands in the presence of the subscribing witnesses.

ANSON O. KITTREDGE.
ERNEST R. KITTREDGE.

Witnesses as to A. O. Kittredge:
   THOMAS S. CRANE,
   H. W. C. VEDDER.

Witnesses as to E. R. Kittredge:
   E. P. MCKISSICK,
   T. C. H. DUKES.